(12) United States Patent
Drake et al.

(10) Patent No.: US 9,688,220 B2
(45) Date of Patent: Jun. 27, 2017

(54) VEHICLE APPARATUS CONTROL FROM REAR SEAT

(71) Applicant: GM GLOBAL TECHNOLOGY OPERATIONS LLC, Detroit, MI (US)

(72) Inventors: Leah L. Drake, Birmingham, MI (US); David T. Proefke, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 407 days.

(21) Appl. No.: 14/308,592

(22) Filed: Jun. 18, 2014

(65) Prior Publication Data

US 2015/0367789 A1 Dec. 24, 2015

(51) Int. Cl.
*G06F 7/00* (2006.01)
*B60R 16/023* (2006.01)

(52) U.S. Cl.
CPC ................... *B60R 16/023* (2013.01)

(58) Field of Classification Search
CPC ........ B60R 16/02; G01C 21/26; B60N 2/002; B60W 50/10
USPC ...... 701/1, 36; 340/425.5, 449, 457
See application file for complete search history.

(56) References Cited

U.S. PATENT DOCUMENTS

| | | | | |
|---|---|---|---|---|
| 2002/0080014 A1* | 6/2002 | McCarthy | .............. | B60N 2/002 340/426.1 |
| 2005/0216133 A1* | 9/2005 | MacDougall | ........... | E05B 77/26 701/1 |
| 2009/0027188 A1* | 1/2009 | Saban | .................... | B60N 2/002 340/521 |
| 2010/0138113 A1* | 6/2010 | Lee | .......................... | B60Q 9/00 701/45 |
| 2012/0232749 A1* | 9/2012 | Schoenberg | ........... | B60N 2/002 701/36 |
| 2015/0081133 A1* | 3/2015 | Schulz | ................... | B60K 35/00 701/1 |
| 2015/0266395 A1* | 9/2015 | Bradley | ................. | B60N 2/002 701/1 |

FOREIGN PATENT DOCUMENTS

CN 203485855 U 3/2014

OTHER PUBLICATIONS

State Intellectual Property Office of the People's Republic of China, Office Action in Chinese Patent Application No. 201510339718.8 mailed Feb. 28, 2017.

* cited by examiner

*Primary Examiner* — Thomas G Black
*Assistant Examiner* — Luke Huynh
(74) *Attorney, Agent, or Firm* — Lorenz & Kopf, LLP

(57) ABSTRACT

Methods and systems are provided for implementing door engagement detection for a vehicle. A sensor is configured to detect information indicative of a dependent individual occupying a rear seat of the vehicle. The processor is coupled to the sensor, and is configured to prevent control of the apparatus from the rear seat when the information is detected.

17 Claims, 4 Drawing Sheets

VEHICLE APPARATUS CONTROL FROM REAR SEAT

TECHNICAL FIELD

The present disclosure generally relates to the field of vehicles and, more specifically, to methods and systems for controlling operation of vehicle apparatus, such as windows and doors, from a rear seat of the vehicle based at least in part on the detection of occupants in the rear seat.

BACKGROUND

Certain vehicles today have one or more child safety features, such as door locks and window locks that prevent operation of the windows and doors from a rear seat of the vehicle. For example, in certain vehicles when a driver of the vehicle manually activates a switch, occupants in the rear seat will be unable to operate the windows and/or doors of the vehicle. While this may be quite helpful in many situations, in certain situations the driver may forget to activate this switch when children or other dependent individuals occupy the rear seat. In addition, in certain other situations the driver may forget to de-activate the switch when adult, non-dependent individuals occupy the rear seat.

Accordingly, it is desirable to provide improved techniques for restricting or providing control of apparatus, such as vehicle windows and doors, from a rear seat of the vehicle. It is also desirable to provide methods, systems, and vehicles utilizing such techniques. Furthermore, other desirable features and characteristics of the present invention will be apparent from the subsequent detailed description and the appended claims, taken in conjunction with the accompanying drawings and the foregoing technical field and background.

SUMMARY

In accordance with an exemplary embodiment, a method is provided. The method comprises detecting, using a sensor, information indicative of a dependent individual occupying a rear seat of a vehicle, and preventing control of an apparatus of the vehicle from the rear seat when the information is detected.

In accordance with another exemplary embodiment, a system is provided. The system comprises a sensor and a processor. The sensor is configured to detect information indicative of a dependent individual occupying a rear seat of a vehicle. The processor is coupled to the sensor, and is configured to prevent control of an apparatus of the vehicle from the rear seat when the information is detected.

In accordance with another exemplary embodiment, a vehicle is provided. The vehicle includes a body defining an interior of the vehicle, a front seat disposed within the interior, a rear seat disposed within the interior behind the front seat, an apparatus providing for exit from the vehicle, and a control system. The apparatus is selected from the group consisting of: a window of the vehicle, a door of the vehicle, and a seat of the vehicle. The control system comprises a sensor and a processor. The sensor is configured to detect information indicative of a dependent individual occupying the rear seat. The processor is coupled to the sensor, and is configured to prevent control of the apparatus from the rear seat when the information is detected.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
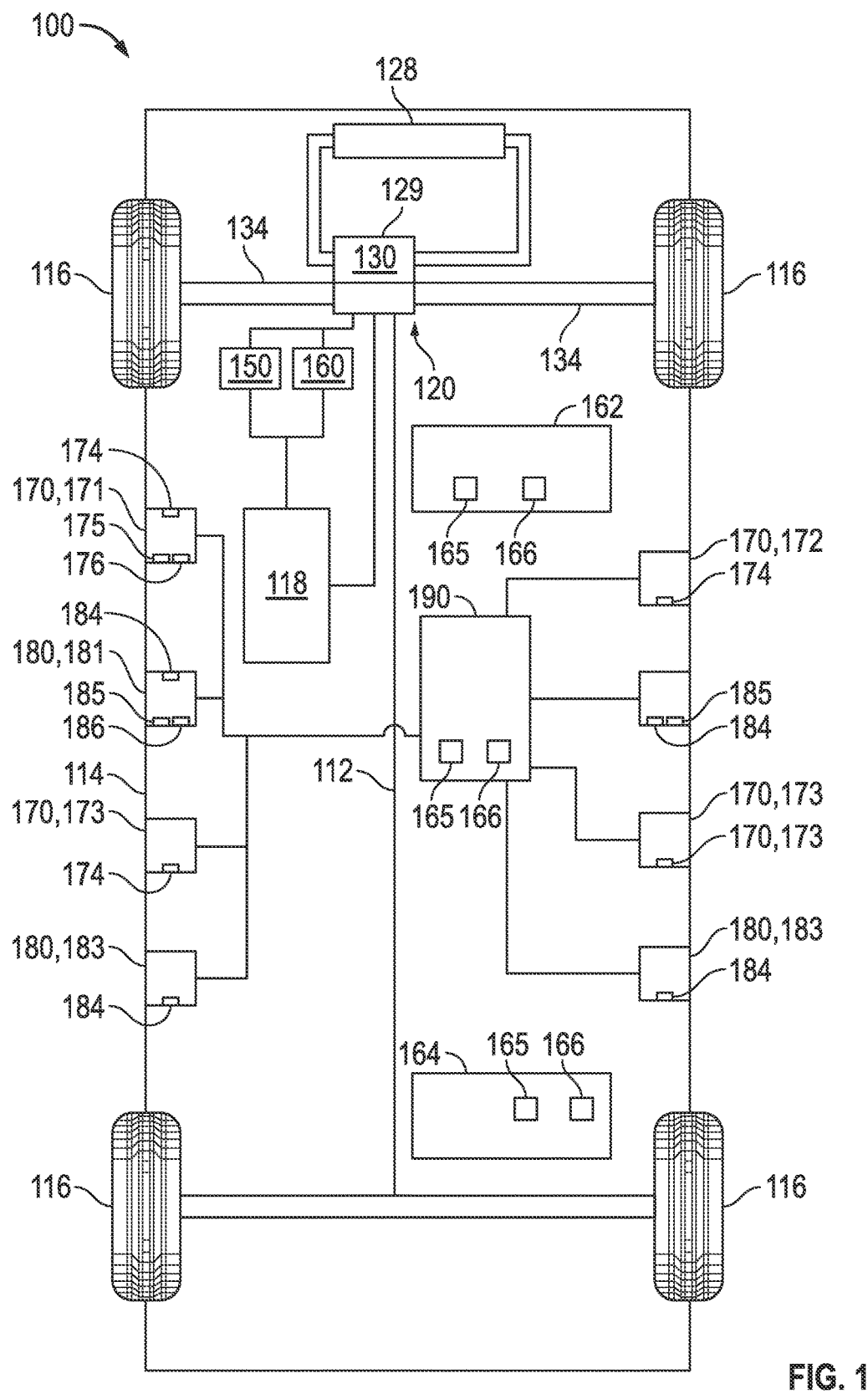
FIG. 1 is a functional block diagram of a vehicle that includes a control system for controlling vehicle apparatus, such as windows and doors, from a rear seat of the vehicle.

FIG. 1 illustrates a vehicle 100, or automobile, according to an exemplary embodiment. As described in greater detail further below, the vehicle 100 includes a control system 190 that provides for selective restriction of access to controlling vehicle apparatus, such as windows 170 and doors 180, from a rear seat 164 of the vehicle. Specifically, as discussed in further detail below in connection with FIG. 1, as well as further below in connection with FIGS. 2-4, in certain embodiments the control system 190 provides appropriate restrictions on controlling the windows 170 and doors 180 of the vehicle 100 from the rear seats 164, such as when a child or other dependent is occupying a rear seat 164. In certain embodiments, the control system 190 also provides appropriate restrictions on controlling movement of the seats 162, 164 when a child or other dependent is occupying a rear seat 164. As used throughout this Application, a "dependent" individual refers to an individual (such as a child or a person with a physical, mental, or emotional challenge) whom the driver of the vehicle 100 does not wish to be able to operate (e.g., unlock, open, or move) an apparatus that can be used for exiting a vehicle, such as the seats 162, 164, the windows 170 and the doors 180.

With reference again to FIG. 1, the vehicle 100 includes a chassis 112, a body 114, four wheels 116, an electronic control system 118, a steering system 150, a braking system 160, and the above-referenced windows 170, doors 180, and control system 190. The body 114 is arranged on the chassis 112 and substantially encloses the other components of the vehicle 100. The body 114 and the chassis 112 may jointly form a frame. The wheels 116 are each rotationally coupled to the chassis 112 near a respective corner of the body 114. The body 114 defines an interior cabin region in which passengers may sit, including a front row 162 (also referred to as front seats) and one or more rear rows 164 (also referred to as rear seats), as mentioned above. In the depicted embodiment, the front and rear seats 162, 164 each have a power seat device 165 for movement of the respective seat and a memory seat device 166 for returning the respective seat to a predetermined stored position, e.g. when the passenger is about ready to enter or exit the vehicle.

The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD). The vehicle 100 may also incorporate any one of, or combination of, a number of different types of propulsion systems, such as, for example, a gasoline or diesel fueled combustion engine, a "flex fuel vehicle" (FFV) engine (i.e., using a mixture of gasoline and ethanol), a gaseous compound (e.g., hydrogen or natural gas) fueled engine, a combustion/electric motor hybrid engine, and an electric motor.

In the exemplary embodiment illustrated in FIG. 1, the vehicle 100 includes an actuator assembly 120 and a radiator 128. The actuator assembly 120 includes at least one propulsion system 129 mounted on the chassis 112 that drives the wheels 116. In the depicted embodiment, the actuator assembly 120 includes an engine 130. In one embodiment, the engine 130 comprises a combustion engine. In other embodiments, the actuator assembly 120 may include one or more other types of engines and/or motors, such as an electric motor/generator, instead of or in addition to the combustion engine.

Still referring to FIG. 1, the engine 130 is coupled to at least some of the wheels 116 through one or more drive shafts 134. In some embodiments, the engine 130 is mechanically coupled to the transmission. In other embodiments, the engine 130 may instead be coupled to a generator used to power an electric motor that is mechanically coupled to the transmission.

The radiator 128 is connected to the frame at an outer portion thereof. Although not illustrated in detail, the radiator 128 includes multiple cooling channels therein that contain a cooling fluid (i.e., coolant) such as water and/or ethylene glycol (i.e., "antifreeze"), and is coupled to the engine 130.

The steering system 150 is mounted on the chassis 112, and controls steering of the wheels 116. The steering system 150 includes a steering wheel and a steering column (not depicted). The steering wheel receives inputs from a driver of the vehicle. The steering column results in desired steering angles for the wheels 116 via the drive shafts 134 based on the inputs from the driver.

The braking system 160 is mounted on the chassis 112, and provides braking for the vehicle 100. The braking system 160 receives inputs from the driver via a brake pedal (not depicted), and provides appropriate braking via brake units (also not depicted). The driver also provides inputs via an accelerator pedal (not depicted) as to a desired speed or acceleration of the vehicle, as well as various other inputs for various vehicle devices and/or systems, such as one or more vehicle radios, other entertainment systems, environmental control systems, lightning units, navigation systems, and the like (also not depicted).

The windows 170 be coupled or formed within the body 114 of the vehicle 100, and can allow for flow of air and, in certain situations, permit ingress and egress, from the cabin of the vehicle 100 as well known to those skilled in the art. The windows 170 can include, but are not limited to, a driver side front window 171, a passenger side front window 172, and one or more rear windows 173. The windows 170 each have a power window switch 174 for opening and closing the respective window 170. The driver side front window 171 also includes one or more additional power switches 175 for opening and closing other windows 170 of the vehicle 100. In addition, a window lockout switch 176 is also provided, preferably near the driver side front window 171, that allows for the driver to manually override the automatic window locking functionality of the control system 190 for controlling the windows 170 (discussed further below).

The doors 180 can be coupled to the body 114 of the vehicle 100, and can permit ingress and egress from a cabin defined by the body 114 of the vehicle 100 as well known to those skilled in the art. The doors 180 can include, but are not limited to, a driver side front door 181, a passenger side front door 182, and one or more rear doors 183. The doors 180 each have a mechanism 184 for locking and unlocking the respective door 180. The driver side front door 181 and the passenger side front door 182 also each include one or more additional power switches 185 for locking and unlocking other doors 180 of the vehicle 100. In addition, a door lockout switch 186 is also provided, preferably near the driver side front door 181, which allows for the driver to manually override the automatic door locking functionality of the control system 190 for controlling the doors 180 (discussed further below).

It will be appreciate that in certain embodiments the various windows 170, doors 180, and accompanying switches may vary from that depicted in FIG. 1 and described above. For example, in one embodiment, the window and door lockout switches 176, 186 may comprise a single, combined switch, and/or may be disposed elsewhere near the front of the cabin, for example by the front dash board and/or proximate the front passenger window 172 and/or front passenger door 182, among other possible variations.

The control system 190 is mounted on the chassis 112. As mentioned above, the control system 190 provides appropriate restrictions on controlling the seats 162, 154, windows 170, and/or doors 180 of the vehicle 100 from the rear seats 164, such as when a child or other dependent in occupying a rear seat 164. The control system 190 preferably provides these functions in accordance with the process 400 described further below in connection with FIG. 4. The control system 190 may comprise all or part of, and/or may be coupled to, various other vehicle devices and systems, such as, among others, the actuator assembly 120, the electronic control system 118, the rear seats 164 and/or the power seat devices 165 and/or memory devices 166 thereof, the windows 170, and/or the doors 180.

Figure 2:
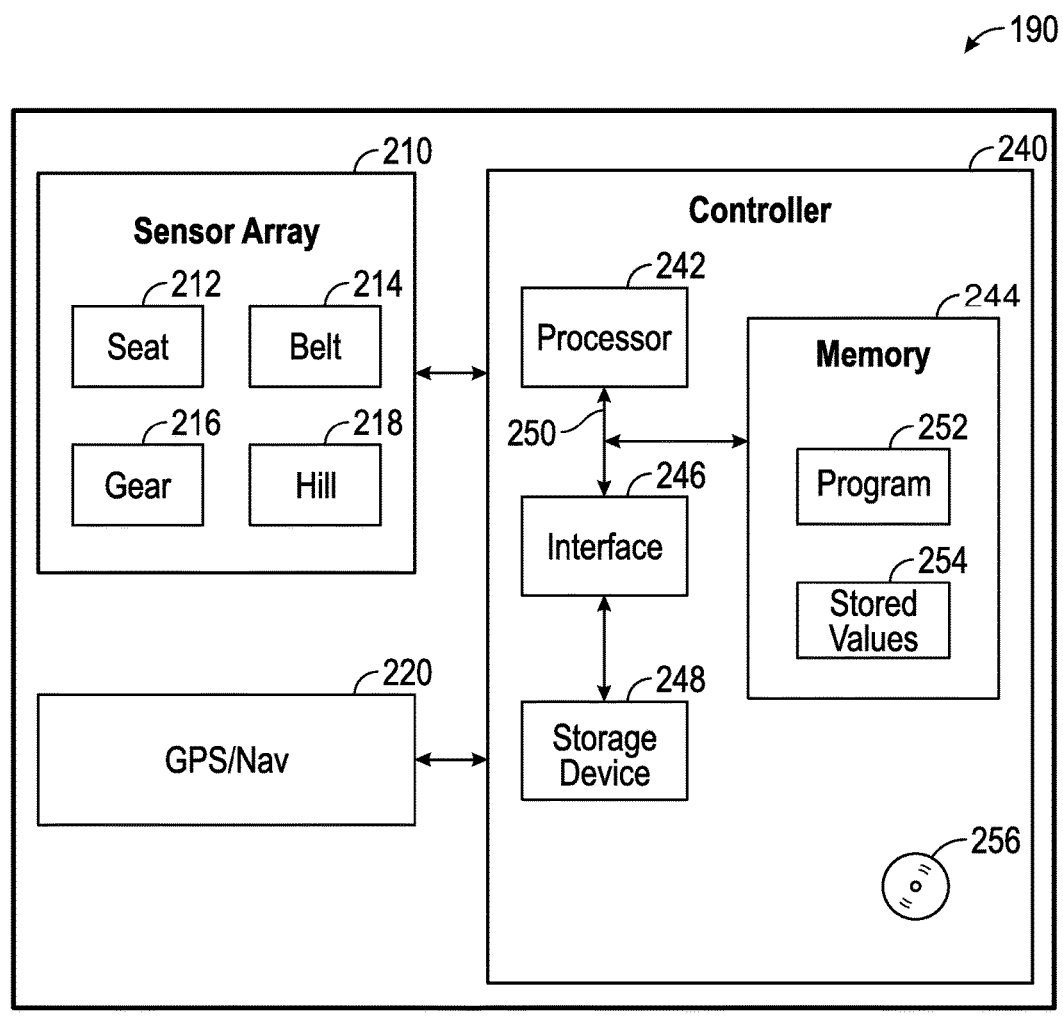
FIG. 2 is a functional block diagram of a control system for vehicle doors that can be used in connection with the vehicle of FIG. 1, in accordance with an exemplary embodiment.

With reference to FIG. 2, a functional block diagram is provided for the control system 190 of FIG. 1, in accordance with an exemplary embodiment. The control system 190 includes a sensor array 210, a location information system 220, and a controller 240 having a processor 242.

As depicted in FIG. 2, the sensor array 210 includes one or more door vehicle seat sensors 212, one or more vehicle seat belt sensors 214, one or more gear sensors 216, and one or more hill detection sensors 218. The seat sensors 212 are preferably disposed within each of the seats of each rear row 164. The seat belt sensors 214 are preferably disposed within each of the seat belts of each rear row 164. The seat sensors 212 and seat belt sensors 214 detect whether the seats of the rear row 164 (also referred to in this Application as rear seats) are occupied, and also detect and provide information as to various characteristics (e.g. size and weight) of the occupants of the rear seats.

Figure 3:
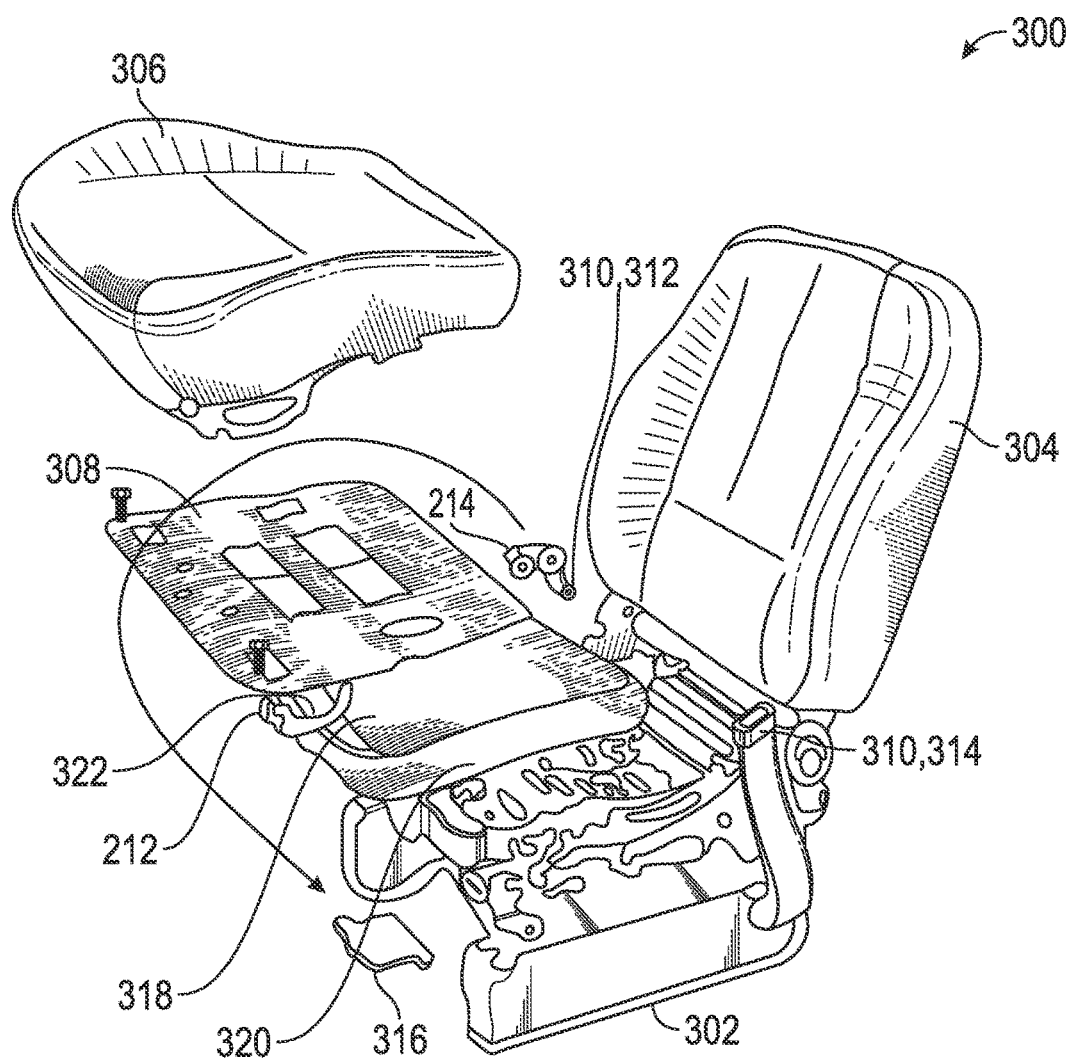
FIG. 3 is a functional block diagram of a vehicle seat that can be used in connection with the vehicle of FIG. 1 and the control system of FIGS. 1 and 2, in accordance with an exemplary embodiment.

With reference to FIG. 3, an exemplary rear seat 300 is depicted, in accordance with an exemplary embodiment. As depicted in FIG. 3, in one embodiment, the rear seat 300 includes a housing 302, a seat back 304, a seating cushion 306. In addition, in one embodiment a bladder 308 with fluid is disposed underneath the seating cushion 306; however, in other embodiments other sensors may be used. Also depicted is a seat belt system 310 that includes a seat belt attachment 312 and a seat belt housing 314, along with a harness (not depicted) coupled to the seat belt attachment 312 in accordance with one exemplary embodiment. While certain types of sensors are depicted in FIG. 3 for illustrative purposes only, it will be appreciated that any number of different types of sensing technologies may be used, including, by way of example, infrared sensing technologies, capacitance sensing technologies, seat mat bladder sensing technologies, weight based load cell sensor technologies, and/or seat belt load cell sensing technologies, among other possible sensing technologies.

In the embodiment of FIG. 3, the seat sensor 212 of FIG. 2 comprises a pressure sensor that is disposed underneath the bladder 308. In certain embodiments, the seat sensor 212 is configured to detect a mass or weight of an occupant of the respective rear seat as well as other size characteristics of the occupant (such as a size or positioning of the pelvis on the rear seat) that can be used in determining an estimated age of the occupant. Similar to the discussion above, any number of other sensing techniques may also be used.

Also in the embodiment of FIG. 3, the seat belt sensor 214 is disposed within, as part of, and/or coupled to the seat belt attachment 312. In certain embodiments, the seat belt sensor 214 is configured to detect proper engagement of the seat belt retention mechanism into the seat belt buckle.

Also depicted in FIG. 3 is an electronic control unit 316. In certain embodiments, the electronic control unit 316 of FIG. 3 processes and/or provides information provided by the seat sensor 212 and/or the seat belt sensor 214 to the processor 242 of FIG. 2 for processing. In some embodiments, the electronic control unit 316 provides determinations regarding the occupant (e.g. an estimated age of the occupant) based on the measurements of the seat sensor 212 and/or the seat belt sensor 214 and provides these determinations to the processor 242 of FIG. 2 for further processing. In other embodiments, the electronic control unit 316 provides raw or intermediate data to the processor 242 of FIG. 2 for processing. In yet other embodiments, the electronic control unit 316 is part of the processor 242 and/or controller 240 of FIG. 2.

Also depicted in FIG. 3 are various other seat components, such as a reactive surface 318 (e.g., a becker board), a noise reduction surface 320 (e.g. felt), and a hose 322. It will be appreciated that the rear seat 300 may vary in different embodiments, and/or that the vehicle 100 may include different types of rear seats 300 in various embodiments. For example, some rear seats 300 may be bucket seats, while other rear seats 300 may be part of a seating bench, among various other possible distinctions. In addition, while seat sensors 212 and seat belt sensors 214 are both depicted in FIGS. 2 and 3, it will be appreciated that in certain embodiments seat sensors 212 may be used without seat belt sensors 214, or vice versa, among other possible differences in the sensors.

In other embodiments, the method for identifying occupancy of the rear seat and determining whether a child or other dependent is present may rely upon other sensing mechanisms known to those skilled in the art. Such mechanisms include one or more of the following used independently or in concert: infrared sensors, ultrasonic motion sensors, camera-based vision sensors.

Returning to FIG. 2, the gear sensor(s) 216 detect a gear or transmission state of the vehicle 100 (e.g. whether the vehicle is in park, drive, reverse). The hill sensors 218 detect information as to whether the vehicle 100 is disposed on a hill. In one embodiment, the hill sensors 218 comprise one or more gradient sensors. Each of the sensors of the sensor array 210 preferably provide signals and/or other information pertaining to their respective detections and measurements to the processor 242 for processing.

The location information system 220 ascertains a position of the vehicle 100. Preferably, the location information system 220 determines a geographical position of the vehicle 100, including a road on which the vehicle 100 is travelling or parked and information pertaining to actual, expected, and/or historical traffic patterns on the road. In one embodiment, the location information system 220 comprises a vehicle navigation system using a global positioning system (GPS) device that receives geographic location information via transceivers and satellites (not depicted) as well as information relating to the traffic flows (e.g. as obtained via a transceiver in communication with a central server and/or as stored in a memory 244 of the controller 240).

The controller 240 is coupled to the sensor array 210 and the location information system 220. In addition, in certain embodiments, the controller 240 is also coupled to one or more other vehicle systems (such as the electronic control system 118 of FIG. 1 and/or the electronic control unit 316 of FIG. 3). The controller 240 receives the information sensed or determined from the sensor array 210 and the location information system, such as weight and size characteristics of an occupant of the rear row 164 as well as information pertaining to the gear and location of the vehicle 100. Based upon this information, the controller 240 provides appropriate instructions for controlling access to control of vehicle apparatus, including the windows 170, the doors 180, and the seats 162, 164 of FIG. 1, from the rear seats 164 of the vehicle 100. The controller 240 preferably performs these functions in accordance with the steps of the process 400 depicted in FIG. 4 and discussed further below in connection therewith.

As depicted in FIG. 2, the controller 240 comprises a computer system. In certain embodiments, the controller 240 may also include one or more of the sensor array 210, location information system 220, and/or one or more other systems. In addition, it will be appreciated that the controller 240 may otherwise differ from the embodiment depicted in FIG. 2. For example, the controller 240 may be coupled to or may otherwise utilize one or more remote computer systems and/or other control systems, such as the electronic control system 118 of FIG. 1 and/or the electronic control unit 316 of FIG. 3.

In the depicted embodiment, the computer system of the controller 240 includes a processor 242, a memory 244, an interface 246, a storage device 248, and a bus 250. The processor 242 performs the computation and control functions of the controller 240, and may comprise any type of processor or multiple processors, single integrated circuits such as a microprocessor, or any suitable number of integrated circuit devices and/or circuit boards working in cooperation to accomplish the functions of a processing unit. During operation, the processor 242 executes one or more programs 252 contained within the memory 244 and, as such, controls the general operation of the controller 240 and the computer system of the controller 240, preferably in executing the steps of the processes described herein, such as the steps of the process 400 (and any sub-processes thereof) in connection with FIG. 4.

The memory 244 can be any type of suitable memory. This would include the various types of dynamic random access memory (DRAM) such as SDRAM, the various types of static RAM (SRAM), and the various types of non-volatile memory (PROM, EPROM, and flash). In certain examples, the memory 244 is located on and/or co-located on the same computer chip as the processor 242. In the depicted embodiment, the memory 244 stores the above-referenced program 252 along with one or more stored values 254 for use in making the determinations. In one such embodiment, the stored values 254 comprise weight and/or other size characteristics of a profile of an individual known to the driver of the vehicle 100 who may sit in a rear seat 164 and whom the driver does not wish to have control of operating such apparatus (e.g. doors and windows) of the vehicle 100.

The bus 250 serves to transmit programs, data, status and other information or signals between the various components of the computer system of the controller 240. The interface 246 allows communication to the computer system of the controller 240, for example from a system driver and/or another computer system, and can be implemented using any suitable method and apparatus. It can include one or more network interfaces to communicate with other systems or components. The interface 246 may also include one or more network interfaces to communicate with technicians, and/or one or more storage interfaces to connect to storage apparatuses, such as the storage device 248.

The storage device 248 can be any suitable type of storage apparatus, including direct access storage devices such as hard disk drives, flash systems, floppy disk drives and optical disk drives. In one exemplary embodiment, the storage device 248 comprises a program product from which memory 244 can receive a program 252 that executes one or more embodiments of one or more processes of the present disclosure, such as the steps of the process 400 (and any sub-processes thereof) of FIG. 3, described further below. In another exemplary embodiment, the program product may be directly stored in and/or otherwise accessed by the memory 244 and/or a disk (e.g., disk 256), such as that referenced below.

The bus 250 can be any suitable physical or logical means of connecting computer systems and components. This includes, but is not limited to, direct hard-wired connections, fiber optics, infrared and wireless bus technologies. During operation, the program 252 is stored in the memory 244 and executed by the processor 242.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 242) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will similarly be appreciated that the computer system of the controller 240 may also otherwise differ from the embodiment depicted in FIG. 2, for example in that the computer system of the controller 240 may be coupled to or may otherwise utilize one or more remote computer systems and/or other control systems.

Figure 4:
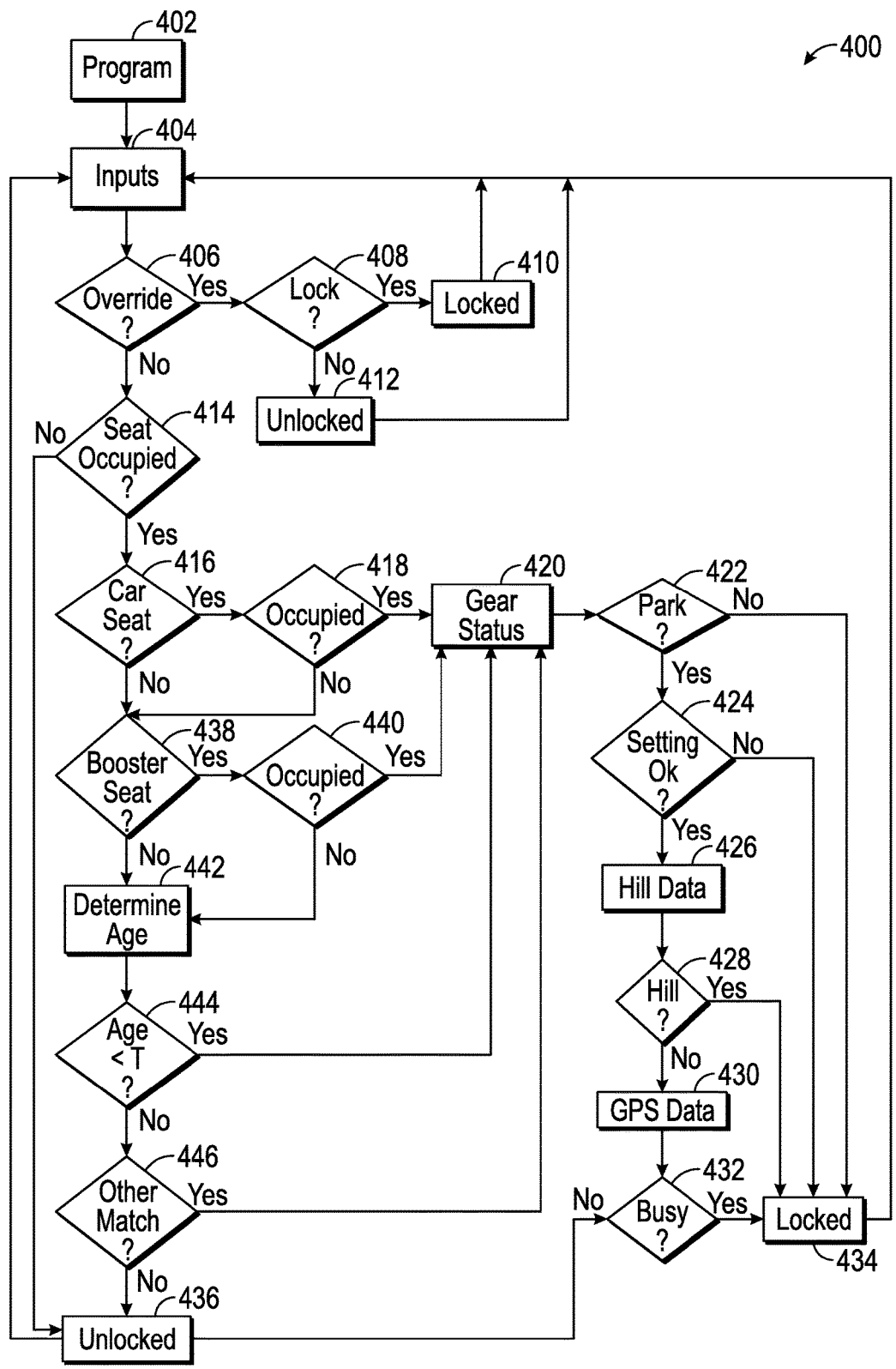
FIG. 4 is a flowchart of a process for controlling vehicle apparatus, such as windows and doors, from a rear seat of the vehicle, and that can be used in connection with the vehicle of FIG. 1, the system of FIG. 2, and the vehicle seat of FIG. 3, in accordance with an exemplary embodiment.

FIG. 4 is a flowchart of a process 400 for implementing vehicle door engagement detection, in accordance with an exemplary embodiment. The process can be implemented in connection with the vehicle 100 of FIG. 1, the control system 190 of FIGS. 1-2, and the rear seat 300 of FIG. 3, in accordance with an exemplary embodiment. The process 400 is preferably performed continuously during a current drive cycle (or ignition cycle) of the vehicle.

In certain embodiments, the process 400 includes the step of receiving pre-programmed instructions from a user (e.g. a driver) of the vehicle of the vehicle 100 for the control system (step 402). In one embodiment, the driver or other user of the vehicle may pre-program the control system to include information regarding weight or other size characteristics of an individual (e.g. a child or an individual with an emotional or mental challenge) known to the driver of the vehicle 100 who may sit in a rear seat 164 and whom the driver does not wish to have control of operating such apparatus (e.g. seats, doors and windows) of the vehicle 100. The pre-programming is preferably performed by the driver before the vehicle is driven. For example, the driver may pre-program the control system ahead of time using a vehicle navigation system (e.g. the location information system 220 of FIG. 2), the driver's personal computer or other device, or the like. The instructions of step 402 are preferably stored in the memory 244 of FIG. 2 as stored values 254 and subsequently retrieved by the processor 242 of FIG. 2. Alternatively, the driver may pre-program or configure the size or weight thresholds which are to be used as criteria for controlling operation of the apparatus.

In addition, various inputs are obtained (step 404). The inputs of step 404 are preferably obtained after the occupants enter the vehicle for a current vehicle drive or ignition cycle of the vehicle. In certain embodiments, the inputs include a detection of whether the driver has expressed a desire to override the control system (e.g. by engaging switches 176 and/or 186 of FIG. 1). In addition, the inputs include information obtained from the sensor array 210 and the location information system 220 of FIG. 2 pertaining to occupancy of the rear rows 164 of the vehicle 100, weight and size characteristics of the occupants, a geographic location of the vehicle 100, and related information as to the geographic location (e.g. as to whether the vehicle 100 is on a hill or on a busy street with oncoming traffic). The inputs of step 404 are preferably provided to the processor 242 of FIG. 2 for processing.

A determination is made as to whether the driver has expressed a desire to override the control system (step 406). In one embodiment, this determination is made by the processor 242 of FIG. 2 based on the inputs obtained from step 404, preferably based on the driver's engagement of switches 176, 186 of FIG. 1. As referred to herein, a driver override may comprise either (i) a driver's desire to prevent control of the rear windows 170, doors 180, and seat controls 165, 166 from the rear seats 164 regardless of the other determinations of the process 400, or (ii) a driver's desire to allow control of the rear windows 170, doors 180, and seat controls 165, 166 from the rear seats 164 regardless of the other determinations of the process 400.

If it is determined in step 406 that an override has occurred, then a determination is made as to the type of override expressed by the driver (step 408). This determination is preferably made by the processor 242 of FIG. 2. If the override comprises a desire by the driver to prevent control of the rear windows 170, doors 180, power seat controls 165, and memory seat controls 166 controls from the rear seats 164 regardless of the other determinations of the process 400, then access to the apparatus (e.g. windows, doors, and seats) is prevented (step 410), regardless of any other determinations of the process 400, unless and until the driver changes the override instruction. Conversely, if the override comprises a desire by the driver to allow control of the rear windows 170, doors 180, and seat controls 165, 166 from the rear seats 164 regardless of the other determinations of the process 400, then access to the apparatus (e.g. windows, doors, and seats) is allowed (step 412), regardless of any other determinations of the process 400, unless and until the driver changes the override instruction. As part of step 410 or 412, the process returns to step 404 for further inputs to detect whether the driver has changed his or her override instruction. In one embodiment, the driver controls 176, 186 may comprise three positions, such that the driver can select to prevent, to allow, or to operate in accordance with the control system.

In addition, it is noted that for the purposes of discussion of FIG. 4, it is assumed that access to control of windows from the rear seat, access to control of doors from the rear seat, and access to power seat and memory seat controls from the rear seat are prevented or restricted together. For example, if access to window control from the rear seat is restricted, so is access to door control from the rear seat and the power seat and memory seat controls from the rear seat under these assumptions, and so on. However, in certain embodiments, this may vary. For example, in certain embodiments the process 400 may prevent access to rear seat control of windows but not doors, or vice versa, windows but not seats, or vice versa, doors but not seats, or vice versa, and so on. In yet other embodiments, the driver can pre-program (in step 402) and/or provide different inputs (in step 404) to provide separate conditions for rear seat control of doors, windows, and seats (for example by providing an override for windows and seats but not doors or vice versa, and so on).

Returning to step 406, if it is determined in step 406 that an override has not occurred, then a determination is made as to whether a rear seat of the vehicle is occupied (step 414). This determination is preferably made by the processor 242 of FIG. 2 based on the inputs of step 404. Specifically, this determination is preferably made by the processor 242 of FIG. 2 based on whether the seat sensors 212 and/or seat belt sensors 214 of FIG. 2 detect the presence of any occupants of any of the rear seats (e.g. by detecting weight applied on the rear seats and/or engagement of the rear seat belts). If it is determined that the rear seats are not occupied, then the process proceeds to step 436 (discussed in greater detail further below), in which rear seat access is allowed for controlling the vehicle apparatus (e.g. windows, seats, and doors). Otherwise, if it is determined that the rear seats are occupied, then the process proceeds to step 416, described directly below.

During step 416, a determination is made as to whether a child car seat is currently occupying one or more of the rear seats. This determination is preferably made by the processor 242 of FIG. 2 based on the inputs of step 404. Specifically, this determination is preferably made by the processor 242 of FIG. 2 based on whether the seat sensors 212 and/or seat belt sensors 214 of FIG. 2 detect the presence of a child car seat (e.g. by detecting weight applied on the rear seats consistent with a child car seat and/or engagement of the rear seat belts or rear latches in securing a child car seat). If it is determined that a child car seat is not occupying any of the rear seats, then the process proceeds to step 438, discussed further below. Otherwise, if it is determined that a child car seat is occupying one of the rear seats, then the process proceeds to step 418, described directly below.

During step 418, a determination is made as to whether a child is disposed within at least one of the child car seats detected in step 416. This determination is preferably made by the processor 242 of FIG. 2 based on the inputs of step 404. Specifically, this determination is preferably made by the processor 242 of FIG. 2 based on whether the weight detected by the seat sensors 212 and/or seat belt sensors 214 of FIG. 2 is consistent with a child being placed within the child car seat, and/or whether a previously measured weight of the child car seat has increased by an amount consistent with a child being present within the child car seat. If it is determined that a child is not present within the child car seat, then the process proceeds to step 438, discussed further below. Otherwise, if it is determined that a child is present within the child car seat, then the process proceeds to step 420, described directly below.

During step 420, a gear status of the vehicle is obtained. In one embodiment, the gear status comprises a gear or transmission state of the vehicle (e.g. as to whether the vehicle is in a "park", "drive", or "reverse" gear or transmission state). The gear status is preferably obtained via information provided by the gear sensors 216 of FIG. 2.

A determination is made as to whether the gear status of step 420 comprises a park gear or transmission state (step 422). If it is determined that the gear status does not comprise a park gear or transmission state, then the process proceeds to step 434 (described in greater further below), in which rear seat access for controlling the vehicle apparatus (e.g. windows and doors) is prevented. Conversely, if it is determined that the gear status comprises a park gear or transmission state, then the process proceeds to step 424, described directly below.

During step 424, a determination is made as to whether the driver settings (if any) from step 402 allow for restrictions to rear seat control for the vehicle apparatus (e.g. windows and doors) to be released under certain conditions when the vehicle is parked. For example, in certain embodiments some drivers may pre-program the control system in step 402 to allow the restrictions on rear seat access to be released when the vehicle is parked, while other drivers may instead pre-program the control system in step 402 to keep the restrictions on rear seat access in place when the vehicle is parked. The determination in step 424 is preferably made by the processor 242 of FIG. 2 based on the pre-programming (e.g., as discussed above) by the driver in step 402. If it is determined in step 424 that the driver settings do not allow for restrictions to rear seat control for the vehicle apparatus to be released when the vehicle is parked, then the process proceeds to step 434 (discussed in greater detail further below), in which rear seat apparatus control is prevented. Conversely, if it is determined in step 424 that the driver settings do allow for restrictions to rear seat control for the vehicle apparatus to be released when the vehicle is parked, then the process proceeds instead to step 426, discussed directly below.

During step 426, data is obtained as to whether the vehicle is parked on a hill. Specifically, the data is preferably obtained by one or more hill sensors 218 of FIG. 2. A determination is then made, using the hill data, as to whether the vehicle is parked on a hill (step 428). This determination is preferably made by the processor 242 of FIG. 2. If it is determined in step 428 that the vehicle is parked on a hill, then the process proceeds to step 434 (discussed in greater detail further below), in which rear seat apparatus control is prevented. Conversely, if it is determined in step 428 that the vehicle is parked on a hill, then the process proceeds instead to step 430, discussed directly below.

During step 430, data is obtained as to characteristics of a location on which the vehicle is parked. Specifically, the data is preferably obtained by the location information system 220 of FIG. 2 (e.g., a vehicle navigation and/or GPS system). The data preferably includes a roadway or parking lot in which the vehicle is parked, along with information as to whether oncoming traffic is likely (e.g., using real-time data and/or historical data for the roadway or parking lot).

A determination is then made as to whether oncoming traffic is likely (step 432). This determination is preferably made by the processor 242 of FIG. 2. In one embodiment, this determination comprises a determination as to whether any traffic is likely. In another embodiment, this determination comprises a determination as to whether an amount of vehicles passing by per unit of time (e.g., per minute) exceeds a predetermined threshold and/or whether a velocity of vehicles passing by is likely exceed a predetermined threshold (e.g., based on speed limit postings). If it is determined in step 432 that oncoming traffic is likely (e.g. that the vehicle is parked on a busy street or in a busy parking lot), then the process proceeds to step 434 (discussed in greater detail further below), in which rear seat apparatus control is prevented. Conversely, if it is determined in step 432 that oncoming traffic is unlikely (e.g., that the vehicle is not parked on a busy street or in a busy parking lot), then the process proceeds instead to step 436 (discussed in greater detail further below), in which rear seat apparatus control is allowed. In an alternative embodiment, traffic determination is made through the use of camera-based vision systems, radar, lidar, or other technologies known to those skilled in the art.

Returning to step 416 (discussed above), if it is determined in step 416 that a child care seat is currently occupying one or more of the rear sets, then in one embodiment a determination is made as to whether a booster seat is currently occupying one or more of the rear seats (step 438). This determination is preferably made by the processor 242 of FIG. 2 based on the inputs of step 404. Specifically, this determination is preferably made by the processor 242 of FIG. 2 based on whether the seat sensors 212 and/or seat belt sensors 214 of FIG. 2 detect the presence of a booster seat (e.g. by detecting weight applied on the rear seats consistent with a booster seat and/or engagement of the rear seat belts or rear latches in securing a booster seat). If it is determined that a booster seat is not occupying any of the rear seats, then the process proceeds to step 442, discussed further below. Otherwise, if it is determined that a booster seat is occupying one of the rear seats, then the process proceeds to step 440, described directly below.

During step 440, a determination is made as to whether a child is disposed within at least one of the booster seats detected in step 438. This determination is preferably made by the processor 242 of FIG. 2 based on the inputs of step 404. Specifically, this determination is preferably made by the processor 242 of FIG. 2 based on whether the weight detected by the seat sensors 212 and/or seat belt sensors 214 of FIG. 2 is consistent with a child being placed within the booster seat, and/or whether a previously measured weight of the booster seat has increased by an amount consistent with a child being present within the booster seat. If it is determined that a child is present within the booster seat, then the process proceeds to step 420, described above. Otherwise, if it is determined that a child is not present within the booster seat, then the process proceeds to step 442 (discussed below), in which an age of the occupant of the rear seat is determined.

It is noted that while child car seats and booster seats are treated similarly in the embodiment of FIG. 4, it will be appreciated that this may vary in certain embodiments. For example, in certain embodiments rear seat apparatus control may be prevented for child car seats but not for booster seats. In certain other embodiments, the driver may pre-program the control system in step 402 to treat child car seats differently from booster seats in certain situations (e.g., because booster seats may involve relatively older children), which could correspondingly alter certain of the conditions and/or criteria set forth herein. It will also be appreciated that in certain embodiments the treatment of child car seats and/or booster seats may otherwise vary, for example in that certain embodiments rear seat control may be prevented upon detection of a child car seat and/or booster seat without requiring a determination of whether the child car seat and/or booster seat are occupied, among other possible variations.

As mentioned above, during step 442 an age of an occupant of a rear seat of the vehicle is determined. In one embodiment, the age is determined by the processor 242 of FIG. 2 using information obtained by the seat sensors 212 and/or seat belt sensors 214 of FIG. 2 during step 404. In one embodiment, the age is determined based on the mass or weight of the occupant, and/or other size characteristics of the occupant using the sensors 212, 214 (such as, by way of example, an amount of seat belt harness required to strap in the occupant and/or the position of the pelvis on the seat). In addition, in one embodiment, if multiple occupants are present in the rear rows of the vehicle, then in one embodiment the age in step 442 is determined to be the age of the youngest of the occupants.

A determination is then made as to whether the age of step 442 is less than a predetermined threshold (step 444). The predetermined threshold comprises an age after which an individual would be deemed to be able to freely control operation of the rear windows and doors without posing a safety risk and without imposing an inconvenience for the driver. In certain embodiments, this threshold may be calibrated by the driver in step 402. This determination is preferably made by the processor 242 of FIG. 2. If it is determined in step 444 that the age is less than the predetermined threshold, then the process proceeds to step 420, discussed above. Otherwise, if it is determined in step 444 that the age is greater than or equal to the predetermined threshold, then the process instead proceeds to step 446, described directly below.

During step 446, a determination is made as to whether weight and size characteristics of an occupant of one of the rear seats matches that of a profile of a known individual (for example, a child or other dependent of the driver of the vehicle) for whom the driver does not want to allow to control operation of the windows and doors. For example, in one embodiment, the determination of step 446 can be used to restrict access to window and door control from the rear seat for individuals whose weight or size requirements may not have been classified as a child in steps 442 and 444 (e.g., a child who is larger than other children his or her age or an older individual with mental challenges). The determination of step 446 is preferably made by the processor 142 of FIG. 2 by comparing the weight and size characteristics of step 404 with profile data that has been stored in the memory 244 of FIG. 2 as stored values 254 from the driver's pre-programming of step 420. For example, during the pre-programming, the driver may enter height and weight information regarding such an occupant, and/or the driver may have the occupant seated in the vehicle and then program the control system to store the sensed weight and size characteristics of the occupant. If it is determined in step 446 that the weight and size characteristics of the occupant match the profile, then the process proceeds to step 420, discussed above. Otherwise, if it is determined in step 446 that the weight and size characteristics do not match the profile, then the process instead proceeds to step 436, described directly below.

During step 436, rear seat access is permitted for controlling the vehicle apparatus. Specifically, in one embodiment, during 436, the processor 242 of FIG. 2 provides instructions for the controller 240 to allow occupants seated in the rear seats 164 of the vehicle to open and close the rear windows 173, to lock and unlock, open and close the rear doors 183, and to control movement of certain seats (particularly the rear seats 164 via the power seat controls 165 and memory controls 166) of the vehicle 100 of FIG. 1.

Conversely, during step 434, rear seat access is prevented for controlling the vehicle apparatus. Specifically, in one embodiment, during 434, the processor 242 of FIG. 2 provides instructions for the controller 240 to prevent occupants seated in the rear seats 164 of the vehicle from opening and closing the rear windows 173, from locking and unlocking and opening and closing the rear doors 183, and from altering the position of the rear seat or seats 164 of the vehicle 100 of FIG. 1.

Accordingly, the process 400 provides for selective access from the rear seats of the vehicle for controlling apparatus (e.g. windows, seats, and doors) of the vehicle. Specifically, in certain embodiments, such rear seat control is prevented (step 434) if a child or other dependent is occupied in one of the rear seats (e.g., as determined in steps 442, 444, and 446). In certain embodiments, rear seat apparatus control is also prevented if a child car seat or booster seat is detected in one of the rear seats (e.g., as determined in steps 416 or 438). In some of these embodiments, rear seat apparatus control may be prevented only upon a further condition that the child car seat or booster seat by presently occupied (e.g., as determined in steps 418 and 440). In addition, in certain embodiments, rear seat apparatus control may be prevented based also on other conditions, such as a driver's engagement of an override switch (e.g., as determined in steps 408, 410, and 412), a driver's pre-programming of the control system (e.g., as determined in step 424), the gear or transmission state of the vehicle (e.g., as determined in steps 420 and 422), and other factors such as whether the vehicle is parked on a hill (e.g., as determined in steps 426 and 428) or on a busy street (e.g., as determined in steps 430, 432). Conversely, if there are no occupants in the rear seats (e.g., as determined in steps 414, 418, and/or 440), any occupants in the rear seats are not classified as dependents (e.g., as determined in steps 442, 444, and 446), and/or other conditions and/or driver preferences do not call for prevention of rear seat apparatus control (e.g., as determined in steps 420, 422, 444, 426, 428, 430, and 432), then the rear seat apparatus control is allowed (step 436).

It will be appreciated that the disclosed methods, systems, and vehicles may vary from those depicted in the Figures and described herein. For example, the vehicle 100, control system 190, the rear seat 300, and/or various components thereof may vary from that depicted in FIGS. 1-3 and described in connection therewith. In addition, it will be appreciated that certain steps of the process 400 may vary from those depicted in FIG. 4 and/or described above in connection therewith. For example, similar to the discussion above, it will be appreciated that certain of the conditions for preventing or allowing rear seat apparatus control may vary in different embodiments. It will similarly be appreciated that certain steps of the process described above may occur simultaneously or in a different order than that depicted in FIG. 4 and/or described above in connection therewith.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the appended claims and the legal equivalents thereof.

We claim:

1. A method comprising:
   detecting, using a sensor, information indicative of a dependent individual occupying a rear seat of a vehicle;
   determining whether the vehicle is in a park mode;
   determining whether the vehicle is parked on a street with oncoming traffic;
   allowing control of an apparatus of the vehicle from the rear seat when the vehicle is in the park mode, provided that the vehicle is not parked on a street with oncoming traffic; and
   preventing control of the apparatus of the vehicle from the rear seat when the information is detected, when the vehicle is parked on a street with oncoming traffic.

2. The method of claim 1, wherein the step of preventing control comprises:
   preventing control of a window of the vehicle when the information is detected, when the vehicle is parked on a street with oncoming traffic.

3. The method of claim 1, wherein the step of preventing control comprises:
   preventing control of a door of the vehicle when the information is detected, when the vehicle is parked on a street with oncoming traffic.

4. The method of claim 1, wherein the step of preventing control comprises:
   preventing motion of a rear seat of the vehicle when the information is detected, when the vehicle is parked on a street with oncoming traffic.

5. The method of claim 1, further comprising:
   determining whether a child car seat is positioned on the rear seat using the information;
   wherein the step of preventing control comprises preventing control of the apparatus of the vehicle when the child car seat is positioned on the rear seat, when the vehicle is parked on a street with oncoming traffic.

6. The method of claim 5, further comprising:
   determining whether the child car seat is occupied;
   wherein the step of preventing control comprises preventing control of the apparatus of the vehicle when the child car seat is occupied, when the vehicle is parked on a street with oncoming traffic.

7. The method of claim 1, further comprising:
   determining an age of an individual seated in the rear seat using the information;
   wherein the step of preventing control comprises preventing control of the apparatus of the vehicle when the age of the individual seated in the rear seat is less than a predetermined threshold, when the vehicle is parked on a street with oncoming traffic.

8. The method of claim 1, further comprising:
determining whether an individual seated in the rear seat matches a stored profile of an individual for whom it is not desired to provide access to control operation of the apparatus of the vehicle;
wherein the step of preventing control comprises preventing control of the apparatus of the vehicle when the individual seated in the rear seat matches the stored profile, when the vehicle is parked on a street with oncoming traffic.

9. The method of claim 1, further comprising:
determining whether the vehicle is parked on a hill;
wherein the step of allowing control further comprises:
allowing control of the apparatus of the vehicle from the rear seat when the vehicle is in the park mode, provided that the vehicle is not parked on a hill and is not parked on a street with oncoming traffic; and
preventing control of the apparatus of the vehicle from the rear seat when the vehicle is parked on a hill.

10. A system comprising:
a first sensor configured to detect information indicative of a dependent individual occupying a rear seat of a vehicle;
a second sensor configured to provide information as to whether the vehicle is in a park mode:
a third sensor configured to provide information as to whether the vehicle is on a hill;
a navigation system configured to provide information as to whether the vehicle is on a street with oncoming traffic; and
a processor coupled to the first sensor, the second sensor, and the third sensor, and configured to:
allow control of an apparatus of the vehicle from the rear seat when the vehicle is in the park mode, provided that the vehicle is not parked on a hill and is not parked on a street with oncoming traffic;
prevent control of the apparatus of the vehicle from the rear seat when the information is detected, when the vehicle is parked on a hill; and
prevent control of the apparatus of the vehicle from the rear seat when the information is detected, when vehicle is parked on a street with oncoming traffic.

11. The system of claim 10, wherein the processor is configured to:
determine whether a child car seat is positioned on the rear seat using the information; and
prevent control of the apparatus of the vehicle when the child car seat is positioned on the rear seat, when the vehicle is parked on a hill or is parked on a street with oncoming traffic.

12. The system of claim 10, wherein the processor is configured to:
determine an age of an individual seated in the rear seat using the information; and
prevent control of the apparatus of the vehicle when the age of the individual seated in the rear seat is less than a predetermined threshold, when the vehicle is parked on a hill or is parked on a street with oncoming traffic.

13. The system of claim 10, wherein the processor is configured to prevent control of a window of the vehicle when the information is detected, when the vehicle is parked on a hill or is parked on a street with oncoming traffic.

14. The system of claim 10, wherein the processor is configured to prevent control of a door of the vehicle when the information is detected, when the vehicle is parked on a hill or is parked on a street with oncoming traffic.

15. The system of claim 10, wherein the processor is configured to prevent motion of a rear seat when the information is detected, when the vehicle is parked on a hill or is parked on a street with oncoming traffic.

16. A vehicle comprising:
a body defining an interior of the vehicle;
a front seat disposed within the interior;
a rear seat disposed within the interior, behind the front seat;
an apparatus providing for exit from the vehicle, the apparatus selected from the group consisting of: a window of the vehicle, a door of the vehicle, and a seat of the vehicle; and
a control system comprising:
a sensor configured to detect information indicative of a dependent individual occupying the rear seat; and
a processor coupled to the sensor and configured to prevent control of the apparatus from the rear seat when the information is detected, wherein the processor is configured to prevent an occupant seated in the rear seat from altering a position of the rear seat, when the information is detected that is indicative of a dependent individual occupying the rear seat.

17. The vehicle of claim 16, further comprising:
a second sensor configured to provide information as to whether the vehicle is in a park mode;
a third sensor configured to provide information as to whether the vehicle is on a hill; and
a navigation system configured to provide information as to whether the vehicle is on a street with oncoming traffic;
wherein the processor is configured to:
allow control of the apparatus of the vehicle from the rear seat when the vehicle is in the park mode, provided that the vehicle is not parked on a hill and is not parked on a street with oncoming traffic;
prevent control of the apparatus of the vehicle from the rear seat when the information is detected, when the vehicle is parked on a hill; and
prevent control of the apparatus of the vehicle from the rear seat when the information is detected, when vehicle is parked on a street with oncoming traffic.

* * * * *